Sept. 4, 1956
H. SANDLER
2,761,374
SMOKEHOUSE
Filed Aug. 15, 1955
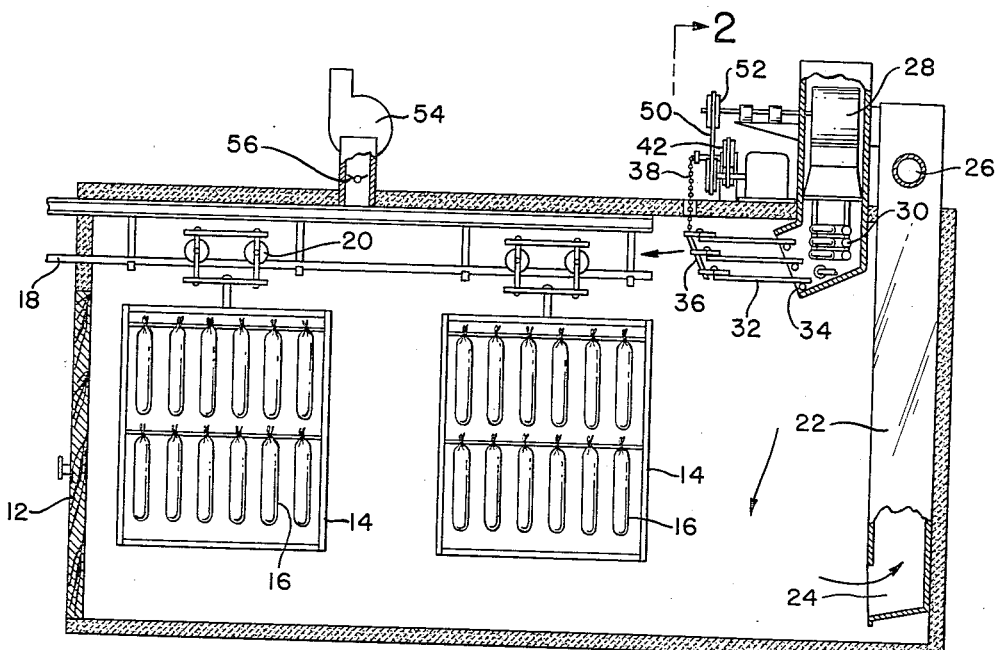
FIG. 1
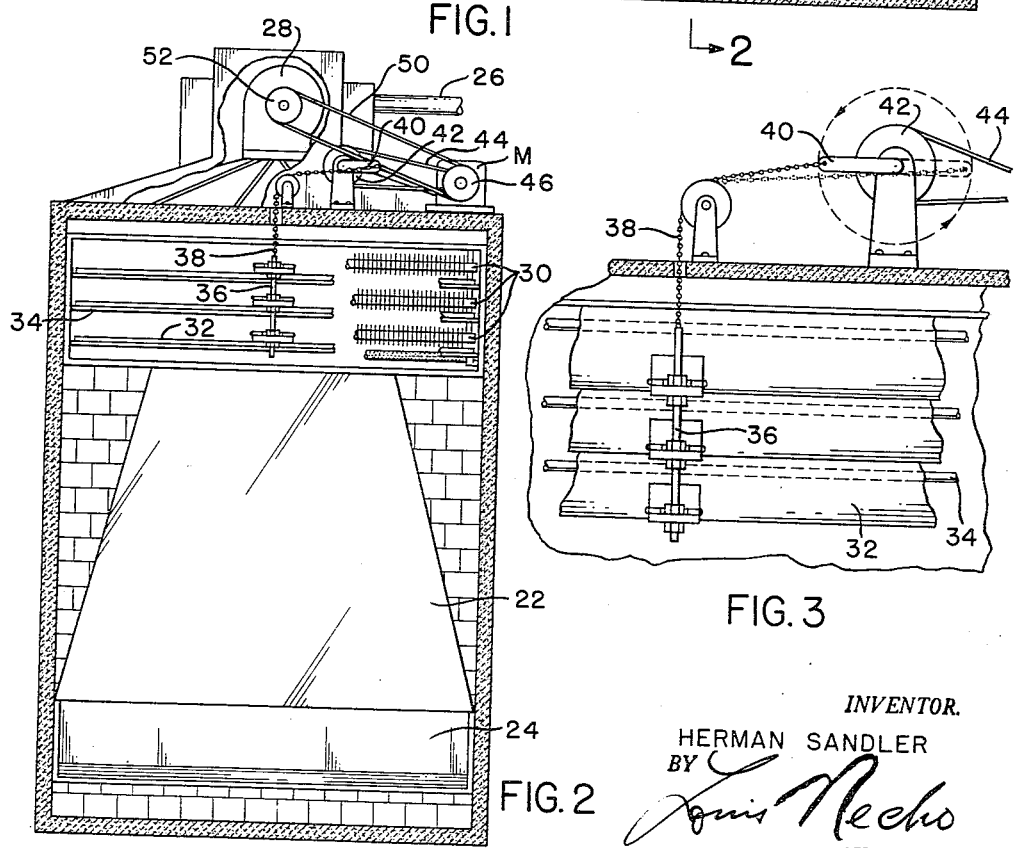
FIG. 2
FIG. 3
INVENTOR.
HERMAN SANDLER
BY
ATTORNEY United States Patent Office 2,761,374
Patented Sept. 4, 1956

2,761,374

SMOKEHOUSE

Herman Sandler, Philadelphia, Pa.

Application August 15, 1955, Serial No. 528,235

1 Claim. (Cl. 99—259)

My invention relates to a smokehouse of the type used for curing and preserving various meat products.

The object of this invention is to produce an improved smokehouse in which the meat product is cured uniformly without the necessity of from time to time turning the meat products.

A further object is to produce an improved smokehouse which will operate efficiently and automatically.

These and other objects are attained by my invention as set forth in the following specification and as shown in the accompanying drawing in which:

Fig. 1 is a view partly in vertical section and partly in elevation of a smokehouse embodying my invention.

Fig. 2 is a similar view looking in the direction of line 2—2 on Fig. 1.

Fig. 3 is an enlargement of the central upper portion of Fig. 2 showing the louvers in their lowermost position.

Referring to the drawing, 10 designates a casing which is preferably heat insulated and constitutes the curing chamber. This casing is provided with a suitable door 12 through which trucks or the like 14 carrying the meat products 16 may be brought into, and removed from, the chamber. The trucks are supported by, and are movable on, a monorail 18, by means of rollers 20. To one side of the trucks 14 is a flue 22, the lower end 24 of which is open and the upper end of which is provided with a smoke inlet opening 26. Communicating with the interior of hood 22 is a blower 28 which draws air and smoke from the hood and blows the mixture over heating coils 30. Adjacent the heating coils 30 are louvers 32 which are pivoted at their inner ends as at 34. The other ends of the louvers are interconnected for joint movement by means of a link 36. The link 36 is connected by chain 38 to a crank 40 which is rotated by means of a pulley 42 which is driven by belt 44. Belt 44 is driven by pulley 46 on the shaft of motor M which drives the blower. A belt 50 is driven by pulley 46 and drives pulley 52 on the shaft of blower 28 to drive the latter.

In the top of the casing is mounted a ventilating blower 54 the intake side of which communicates with the top of the casing under control of a valve 56.

The operation is as follows:

With loaded trucks 14 in place, with steam or other heating medium flowing through coils 30 and with smoke flowing in through inlet 26, motor M is energized simultaneously to drive blower 28 and to oscillate louver assembly 32. The blower draws air and smoke from the upper part of flue 22, and blows it between coils 30. The louvers are arranged to move through an arc of about 90 degrees so that, in the horizontal position of the louvers, the heated air and smoke will flow in a substantially horizontal path above the trucks and so that, when the louvers are in a vertical position, the hot air and smoke will flow just to the right of the adjacent vertical side of, and below, the trucks as viewed in Fig. 1. This provides for a complete sweep from a point above to a point below, and to one side, of the trucks. The negative pressure produced by January 28 in flue 22 causes the air and smoke in casing 10 to enter the bottom of the flue 22 for recirculation.

At the beginning of each cycle, or whenever the relative humidity reaches an undesirably high value, valve 56 is opened and blower 54 is energized thereby to remove some of the air from the curing chamber. A suitably valved opening, not shown, is provided for admitting fresh air to replace the air withdrawn by blower 54.

The continuous movement of the gases by blower 28 combined with the oscillation of the louvers, produces a turbulence in the vicinity of the meat products and thus insures a more uniform contact of the gases with the meat products. This, due to the fact that on its downward stroke the louver assembly blows a stream of air against the slightly pressurized ambient air which was delivered during the upward movement of the louver assembly and so on.

What is claimed is:

A smoke house comprising a casing defining a curing chamber, supporting means in said chamber for supporting the product to be smoke, a vertical flue located in one side of said chamber, the lower end of said flue communicating with the lower portion of said chamber and the upper portion of the flue extending above said chamber, there being an opening formed in the upper portion of said flue for admitting smoke thereinto, a blower housing communicating with the upper portion of said flue and including a throat disposed in the upper portion of said chamber to one side of said supporting means, heating coils in the lower portion of said throat, a blower in the upper portion of said blower housing for drawing air and smoke from said flue and blowing it into said chamber through past said coils in said throat, a louver assembly pivotally mounted in said throat for movement through an arc of about 90° so that, in the upper extreme position of said assembly, the air and smoke translated by said blower will flow through said louver assembly in a substantially horizontal path above said products and so that, in the extreme lower position of said louver assembly, said air and smoke will flow in a vertical path to one side of and to a point below said meat products, and means for simultaneously actuating said blower and oscillating said louver assembly.

References Cited in the file of this patent

UNITED STATES PATENTS

| | | |
|---|---|---|
| 2,124,716 | Sperry | July 26, 1938 |
| 2,196,308 | Johnston | Apr. 9, 1940 |
| 2,310,222 | Deverall | Feb. 9, 1943 |
| 2,380,428 | Gilliam | July 31, 1945 |
| 2,505,973 | Julian | May 2, 1950 |
| 2,640,414 | Jensen | June 2, 1953 |